United States Patent
Vagelos

(10) Patent No.: US 9,712,201 B2
(45) Date of Patent: Jul. 18, 2017

(54) MULTI-SIZED SUBSCRIBER IDENTITY MODULE CARD FOR USE ON MULTIPLE WIRELESS DEVICES

(71) Applicant: TracFone Wireless, Inc., Miami, FL (US)

(72) Inventor: Theodore Vagelos, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

(21) Appl. No.: 14/722,788

(22) Filed: May 27, 2015

(65) Prior Publication Data
US 2016/0352378 A1    Dec. 1, 2016

(51) Int. Cl.
*H04B 1/3818*    (2015.01)

(52) U.S. Cl.
CPC .................. *H04B 1/3818* (2015.01)

(58) Field of Classification Search
CPC ............................ H04B 1/3816; H04B 1/3818
USPC .......................................................... 455/558
See application file for complete search history.

(56) References Cited

U.S. PATENT DOCUMENTS

| | | | |
|---|---|---|---|
| 2003/0177674 A1* | 9/2003 | Miller ....................... | G09F 3/10 40/27.5 |
| 2006/0038396 A1* | 2/2006 | Thompson ......... | B42D 15/0053 283/67 |
| 2013/0116010 A1* | 5/2013 | Lepp .................... | G06K 19/077 455/558 |
| 2013/0201646 A1* | 8/2013 | Braun ................. | H05K 5/0282 361/784 |

* cited by examiner

*Primary Examiner* — Tuan Pham
(74) *Attorney, Agent, or Firm* — Baker Hostetler LLP

(57) ABSTRACT

A subscriber identity module card for wireless devices, having a top surface, a bottom surface, a first cut-out space, a first material layer arranged on the bottom surface, a second memory card secured within said first cut-out space, said second memory card having said first material layer arranged on a bottom surface of said second memory card and having a second cut-out space, and a third memory card secured within said second cut-out space, said third memory card having a second material layer arranged on a bottom surface of said third memory card.

19 Claims, 9 Drawing Sheets

MULTI-SIZED SUBSCRIBER IDENTITY MODULE CARD FOR USE ON MULTIPLE WIRELESS DEVICES

BACKGROUND OF THE DISCLOSURE

1. Field of the Disclosure

The invention relates to a Subscriber Identity Module card for use with wireless devices. More particularly, the invention relates to a variable, multi-sized Subscriber Identity Module card for use with a variety of wireless devices.

2. Related Art

A large number of wireless service plans and wireless devices exist for customers desiring wireless or mobile services such as data, talk, text messaging, and various applications and games. The wireless service plans may be compatible with a variety of wireless devices which may employ different hardware. One piece of hardware used by wireless devices is a Subscriber Identity Module (SIM) card. SIM cards exist in a variety of sizes, shapes, and widths, and most wireless devices are limited in terms of which size SIM cards may be compatible with those wireless devices. Wireless device users are not always aware of which SIM card size works on the users' wireless devices, and may sometimes purchase an incorrect SIM card for their wireless device. In addition, some wireless service plans may be compatible with a variety of mobile devices which may use SIM cards of different sizes and types.

Existing SIM cards may be purchased in kits containing multiple sizes of SIM cards. In these kits with multiple SIM card sizes, a customer may select the SIM card that works with the customer's wireless device. However, this selection may result in unused SIM cards. Additionally, SIM cards may be purchased in forms where one smaller SIM card can be removed from a larger SIM card, but the smaller SIM card may not be reused with the larger SIM card after it has been removed from the larger SIM card. By developing a mufti-sized SIM card for wireless devices, there may be fewer unused SIM cards, less confusion in selecting a SIM card that works on a user's wireless device, and more convenient switching of SIM cards for different wireless devices.

SUMMARY OF THE DISCLOSURE

The foregoing needs are met, to a great extent, by the invention, providing a variable, mufti-sized SIM card for use on multiple wireless devices.

According to some aspects of the disclosure, a Subscriber Identity Module card for wireless devices includes a top surface, a bottom surface, a first cut-out space, a first material layer arranged on the bottom surface, a second memory card secured within said first cut-out space, said second memory card having said first material layer arranged on a bottom surface of said second memory card and having a second cut-out space, and a third memory card secured within said second cut-out space, said third memory card having a second material layer arranged on a bottom surface of said third memory card.

According to some aspects of the disclosure, a method of arranging a Subscriber Identity Module card for wireless devices includes arranging a top surface on said subscriber identity module card, arranging a bottom surface on said subscriber identity module card, arranging a first cut-out space, arranging a first material layer on the bottom surface, securing a second memory card within said first cut-out space, arranging said first material layer on a bottom surface of said second memory card, arranging a second cut-out space within said second memory card, securing a third memory card within said second cut-out space, and arranging a second material layer on a bottom surface of said third memory card.

According to some aspects of the disclosure, a Subscriber Identity Module card for wireless devices includes a top surface, a bottom surface, a first cut-out space, a first material layer arranged on the bottom surface, a second memory card secured within said first cut-out space, said second memory card having said first material layer arranged on a bottom surface of said second memory card and having a second cut-out space, and a third memory card secured within said second cut-out space, said third memory card having a second material layer arranged on a bottom surface of said third memory card, wherein the subscriber identity module card is attached to a package, the second memory card is attached to the first memory card, and the third memory card is attached to the second memory card by one or more connecting mechanisms, wherein the subscriber identity module card is detachable from the package, and wherein the subscriber identity module card and the second memory card with the first material layer and the third memory card with the second material layer are detachable from the package.

There has thus been outlined, rather broadly, certain aspects of the invention in order that the detailed description thereof herein may be better understood, and in order that the present contribution to the art may be better appreciated. There are, of course, additional aspects of the invention that will be described below and which will also form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
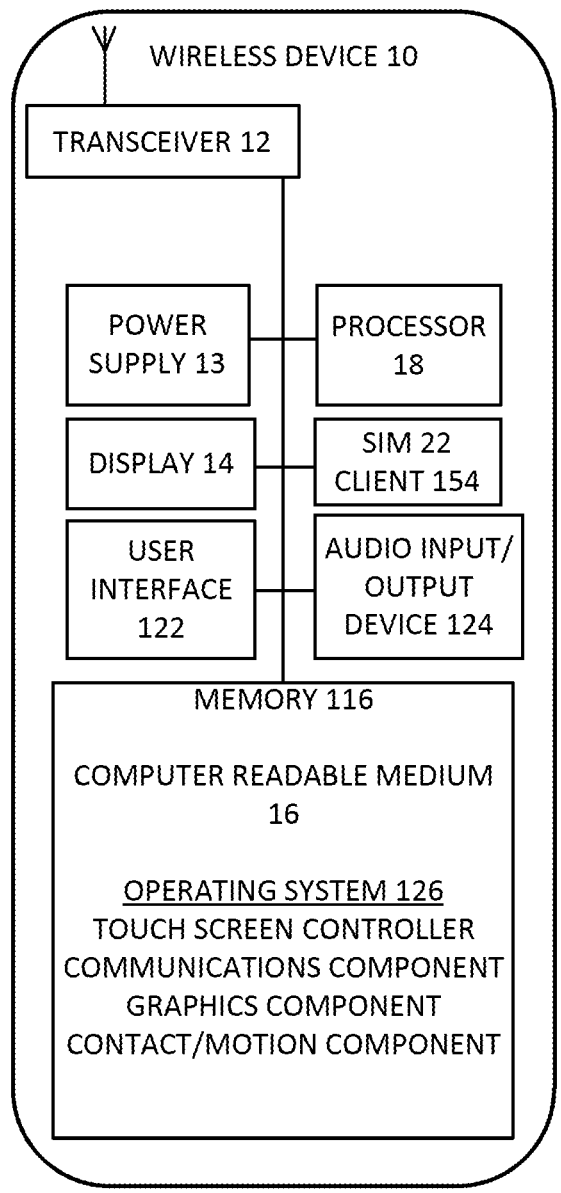
FIG. 1 illustrates a wireless device and its components, according to aspects of the disclosure.

In this specification and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, machine-to-machine (M2M) equipment, Internet-of-Things (IoT) devices, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, and Long-Term Evolution (LTE) network that may utilize the teachings of the present application.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

A large number of wireless service plans exist for customers desiring wireless services such as data, talk, and text messaging. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. An MNO heavily relies on backend systems to address any provisional, billing, security and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including voice and data. MNOs and MVNOs may provide service for a variety of wireless devices compatible with various sizes of SIM cards.

FIG. 1 illustrates an exemplary wireless device 10 and its potential components. The wireless device 10 may include a transceiver 12, a power supply 13, a display 14, a computer readable medium 16, a processor 18, a SIM card 22, a client 154, a memory 116, an audio input/output device 124, an operating system 126, and the like. The transceiver 12 can include, for example, a wireless antenna and associated circuitry capable of data transmission with the mobile data network utilizing at least one data transmission protocol, such as, for example, 3G, 4G Long Term Evolution (LTE), 5G (5th generation mobile networks/wireless systems), Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or the like, and/or combinations thereof. The transceiver 12 may transmit and receive data over the data transmission protocol.

The SIM card 22 may be implemented as a Universal Integrated Circuit Card (UICC). The official definition for UICC is found in ETSI TR 102 216[2] where it is defined as a "smart card that conforms to the specifications written and maintained by the ETSI Smart Card Platform project." For brevity, the SIM card 22 will be referenced throughout, but the invention is equally applicable to a UICC. The SIM was initially specified by the European Telecommunications Standards Institute in the specification with the number TS 11.11. This specification describes the physical and logical behavior of the SIM. It is further noted that 3GPP is now responsible for the further development of applications like SIM (TS 51.011) and USIM (TS 31.102) and ETSI for the further development of the physical card UICC.

The display 14 of the wireless device 10 can display various information provided to the display 14 from the processor 18 of the wireless device 10, computer readable medium 16, or SIM card 22. The screen may be a light-emitting diode display (LED), an electroluminescent display (ELD), a plasma display panel (PDP), a liquid crystal display (LCD), an organic light-emitting diode display (OLED), or any other display technology.

The displayed information can include, for example, the amount of prepaid wireless data service available, the network connection strength, the type of mobile network data connection (such as 3G, 4G LTE, 5G, EVDO, etc.) the wireless device is connected to, and/or other information potentially useful to the user. The information may be displayed simultaneously or the user may interact with an input device such as buttons on the wireless device 10 or, if the display 14 is a touch-screen, with the icons on the display 14 to cycle through the various types of information for display. For example, the display 14 may simultaneously show on the wireless device 10 the amount of memory used and available on the SIM card 22, the amount of prepaid wireless data service available, the network connection strength, and the type of mobile network data connection. Alternatively, the display 14 may only show one type of information, for example, the amount of memory used and available on the SIM card 22, the amount of prepaid wireless data service available for the wireless device 10 (if prepaid service is implemented in the wireless device), or the account associated with the wireless device 10. The display 14 may then show other types of information if the user interacts with buttons on the wireless device 10 or, if the display 14 is a touch-screen, with icons on the display 14.

For the purposes of this disclosure, the computer readable medium 16 may store computer data, which may include computer program code that may be executable by the processor 18 of the wireless device 10 in machine readable form. By way of example, and not limitation, the computer readable medium 16 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 16 or machine readable medium, which may be incorporated into a computer program product. The computer readable medium 16 may also store the values for the amount of memory used and available on the SIM card 22, the amount of wireless data service available, the amount of wireless data service used, how many days of wireless service have been used, how many days of wireless service remaining, and the like. The computer readable medium 16 may also store information such as the amount of data used for each domain, web address, wireless device 10 application, or other web resource during a given time period, such as, for example, one billing cycle.

Additionally, the computer readable medium 16 may communicate to or display on the display 14 the various metrics described above. For example, the computer readable medium 16 may communicate to or show on the display 14 the amount of memory used and available on the SIM card 22, the amount of wireless data service used, the amount of wireless data service remaining on the account, how many days of wireless service have been used, how many days of wireless service remaining, and the like. Similarly, the computer readable medium 16 may also communicate to or show on the display 14 the amount of data sent and received. Moreover, the computer readable medium 16 may communicate to or show on the display 14 the amount of data that may be remaining from the previously purchased and/or credited amount of data.

The processor 18 may execute the data or applications on the SIM card 22. The processor 18 can be, for example, dedicated hardware as defined herein, a computing device as defined herein, a computer processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the metering client.

Additionally, the processor 18 may communicate to or show on the display 14 the various metrics described above. For example, the processor 18 may communicate to or display on the display 14 the amount of memory used and available on the SIM card 22 and the amount of data used on the wireless device 10. Similarly, the processor 18 may also communicate to or show on the display 14 the amount of data sent and received with the wireless device 10 and at which data speed. Moreover, the processor 18 may communicate to or display on the display 14 the amount of data that may be remaining from the previously purchased and/or credited amount of data.

The wireless device 10 may also have a power supply 13. The power supply 13 may be a battery such as nickel cadmium, nickel metal hydride, lead acid, lithium ion, lithium ion polymer, and the like. The wireless device 10 may also include a memory 116, which could be internal memory or a removable storage type such as a memory chip. The memory 116 may store information about the wireless device 10, including wireless profiles and settings. Another information storage type that the wireless device may use is the subscriber identity module (SIM) card 112. The SIM 112 could vary in size and could be a micro, mini, or nano size, and may include a converted combination of any size SIM 112. The SIM 112 may be associated with a client 154 which may manage SIMs 112 to which the wireless device 10 may connect. Additionally, the wireless device 10 may include an audio input/output device 124 for the input or output of sounds in videos, music, and the like.

The wireless device 10 may also have a user interface 122 to facilitate use of the wireless device 10 with an operating system 126. The operating system 126 may be associated with a touchscreen controller, one or more communications components, one or more graphics components, one or more contact/motion components, and the like.

The SIM card 22 may be used on or with one or more wireless devices 10 on a GSM Network. The SIM card 22 may contain account information associated with the wireless device 10 user or concerning the wireless device 10 itself. The SIM card 22 may also store data, messages, applications, records, and the like. The information stored on a SIM card 22 may facilitate a phone call or message.

The SIM card 22 may be portable to be used with more than one wireless device 10, but some wireless device 10 service providers limit their wireless devices 10 to a particular SIM card 22. A SIM card 22 may also be associated with a pre-paid account so that the SIM card 22 only works with certain wireless devices 10 allowed by the service provider. The particular SIM card 22 may vary in size based on the wireless device 10 and the service provider.

Figure 2:
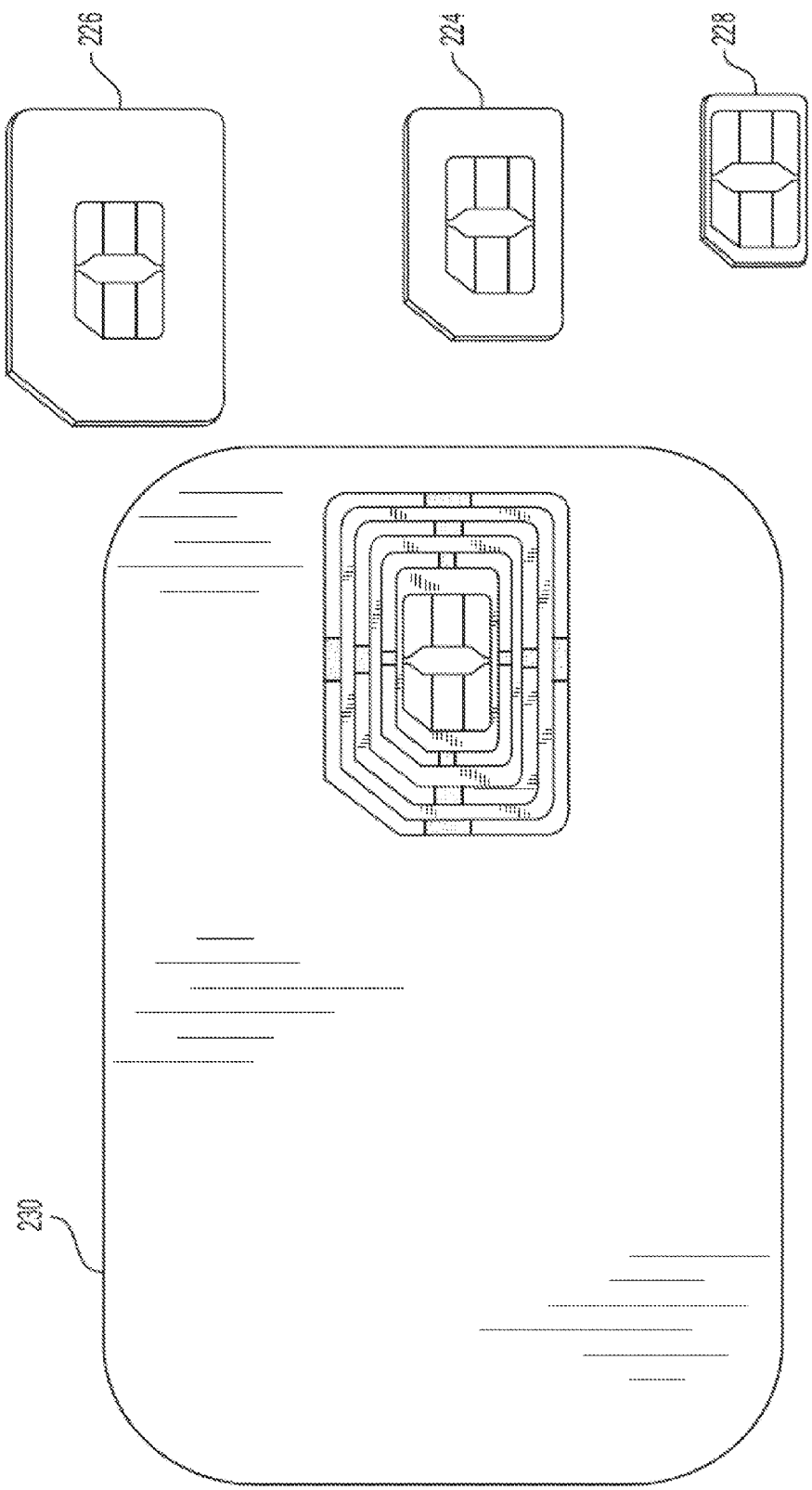
FIG. 2 illustrates exemplary SIM cards of various sizes, according to aspects of the disclosure.

SIM cards 22 generally come in four sizes, each shown in FIG. 2. One common SIM card 22 size is the micro-SIM card 224. Another is the mini-SIM card 226, which is a standard size SIM card 22 and is larger than the micro-SIM card 224. A smaller size than the micro-SIM card 224 is the nano-SIM card 228. The micro-SIM card 224, the mini-SIM card 226, and the nano-SIM card 228 may be packaged individually or may be combined, as explained in more detail herein.

A tri-cut SIM card 230 may be the size of a full-size SIM card so that the tri-cut SIM card 230 may function as a full-size SIM card when the micro-SIM card 224, the mini-SIM card 226, and the nano-SIM card 228 are arranged together within the tri-cut SIM card 230. The tri-cut SIM card 230 may be the size of a credit card. The table below provides exemplary SIM card configurations.

SIM card sizes

| SIM card | Standard reference | Length (mm) | Width (mm) | Thickness (mm) | Volume (mm³) |
| --- | --- | --- | --- | --- | --- |
| Full-Size (1FF) | ISO/IEC 7810:2003, ID-1 | 85.60 | 53.98 | 0.76 | 3511.72 |
| Mini-SIM (2FF) | ISO/IEC 7810:2003, ID-000 | 25.00 | 15.00 | 0.76 | 285.00 |
| Micro-SIM (3FF) | ETSI TS 102 221 V9.0.0, Mini-UICC | 15.00 | 12.00 | 0.76 | 136.80 |
| Nano-SIM (4FF) | ETSI TS 102 221 V11.0.0 | 12.30 | 8.80 | 0.67 | 77.52 |

Figure 3:
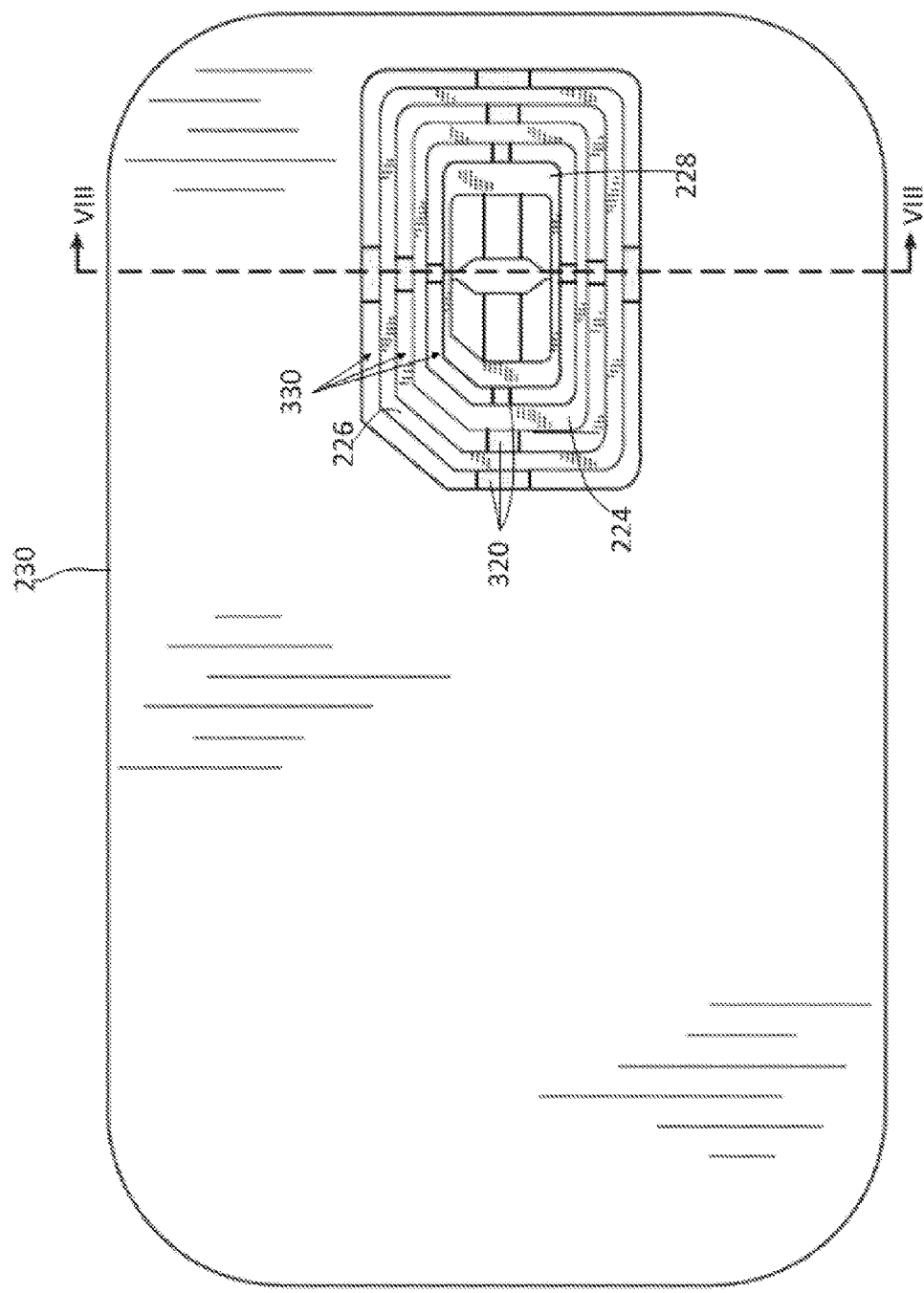
FIG. 3 illustrates tri-cut SIM card, according to aspects of the disclosure.

FIG. 3 illustrates the packaged tri-cut SIM card 230. The micro-SIM card 224, the mini-SIM card 226, and the nano-SIM card 228 may be arranged together in the packaged tri-cut SIM card 230 so that each SIM card 22 may be removed from the tri-cut SIM card 230 or any combination of the SIM cards 22 may be removed from the tri-cut SIM card 230.

To secure the SIM cards 22 in the tri-cut SIM card 230, the tri-cut SIM card 230 may have one or more connecting mechanisms such as tabs 320 that may connect the micro-SIM card 224 to the tri-cut SIM card 230, the mini-SIM card 226 to the micro-SIM card 224, and the nano-SIM card 228 to the mini-SIM card 226. Each of the SIM cards 22 may be removed from the tri-cut SIM card 230 by snapping the SIM card 22 from the tabs 320 or other connecting mechanisms. In order to facilitate the removal of each SIM card 22 from the tri-cut SIM card 230, larger SIM cards 22 may have a cut-out space 330 in which smaller SIM cards 22 may be arranged.

For example, the mini-SIM card 226 may have a cut-out space 330 in which the micro-SIM card 224 may be arranged. The space may be interrupted by the connecting mechanisms such as tabs 320 or the like to hold the micro-SIM card 224 in place. The micro-SIM card 224 may also have a cut-out space 330 in which the nano-SIM card 228 may be arranged. The spaces 330 may allow for easy removal of each SIM card 22 from the tri-cut SIM card 230 and for easy reconfiguration of each SIM card 22 within the tri-cut SIM card 230. Alternatively, reconfiguration of each SIM card 22 into a portion of the tri-cut SIM card 230.

Figure 4:
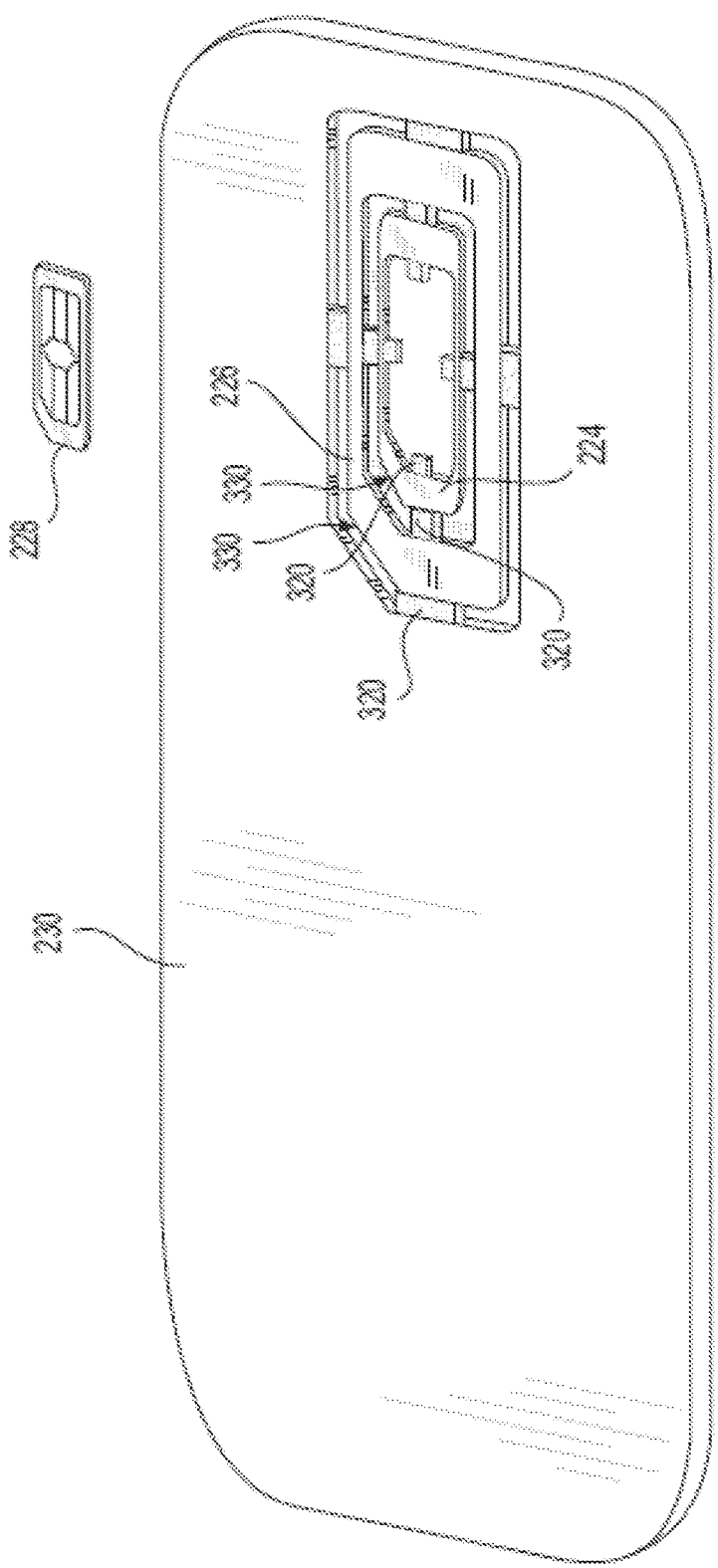
FIG. 4 illustrates a tri-cut SIM card with the nano-SIM card removed, according to aspects of the disclosure.

FIG. 4 illustrates the removal of the nano-SIM card 228 from the tri-cut SIM card 230. To remove the nano-SIM card 228 from the tri-cut SIM card 230, the nano-SIM card 228 may be punched out from the tabs 320 holding the nano-SIM card 228 into the micro-SIM card 224 within the tri-cut SIM card 230. As will be shown more clearly in other figures within this disclosure, the nano-SIM card 228 may have a different material backing than the micro-SIM card 224 and the mini-SIM card 226 have or may need to have the backing removed in order to achieve the desired thickness of 0.67 mm.

Figure 5:
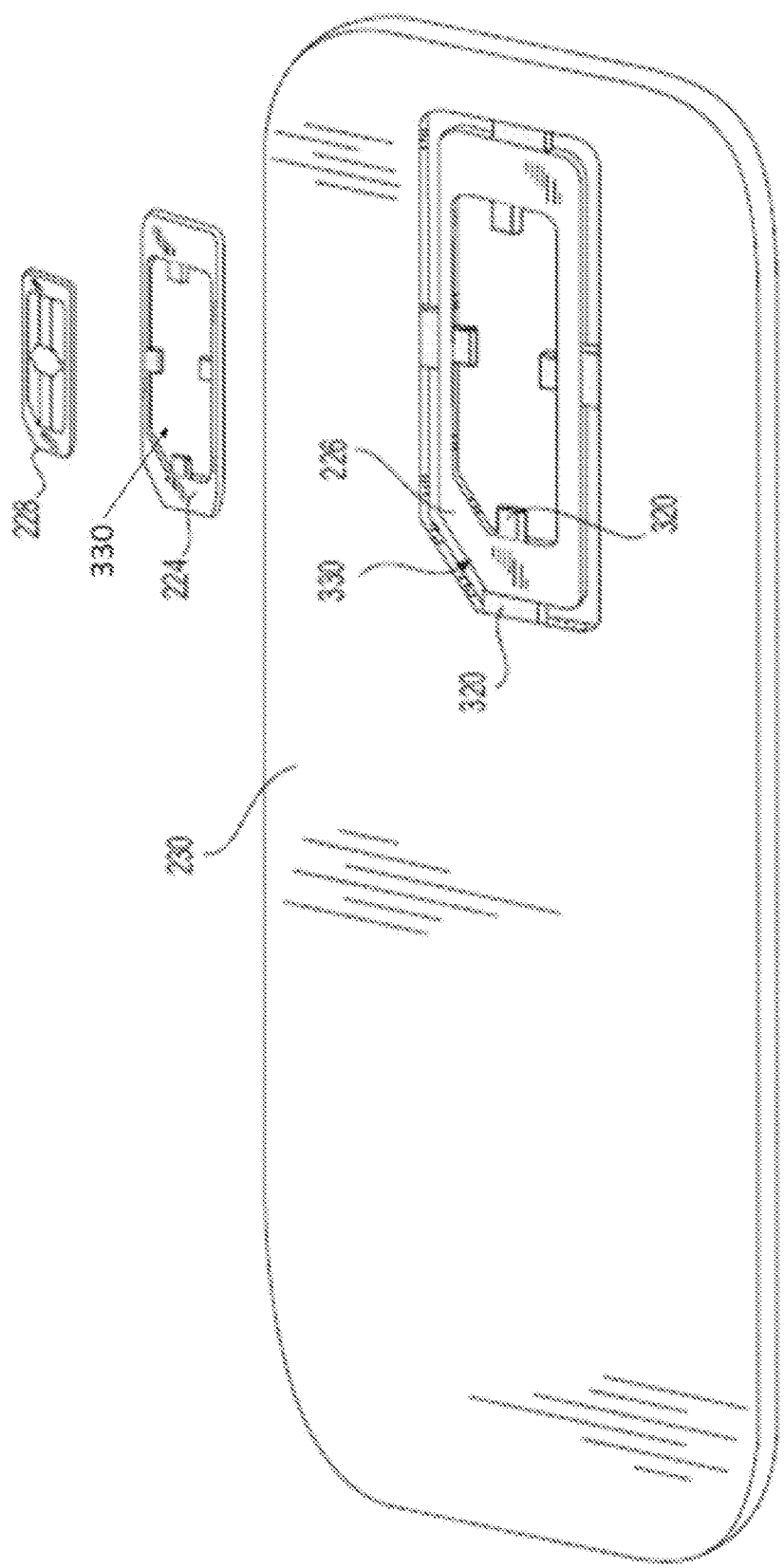
FIG. 5 illustrates a tri-cut SIM card with the nano-SIM card and the micro-SIM card portion removed, according to aspects of the disclosure.

FIG. 5 illustrates the removal of the micro-SIM card 224 from the tri-cut SIM card 230. To remove the micro-SIM card 224 from the tri-cut SIM card 230, the micro-SIM card 224 may be punched out from the tabs 320 holding the micro-SIM card 224 into the mini-SIM card 226 within the tri-cut SIM card 230. The micro-SIM card 224 may be removed from the tri-cut SIM card 230 with the nano-SIM card 228 still connected within the micro-SIM card 224 within the cut-out space 330. The nano-SIM card 228 may be further removed from the cut-out space 330 of the micro-SIM card 224 in a similar fashion as shown and may need to have the backing removed in order to achieve the desired thickness of 0.67 mm.

Figure 6:
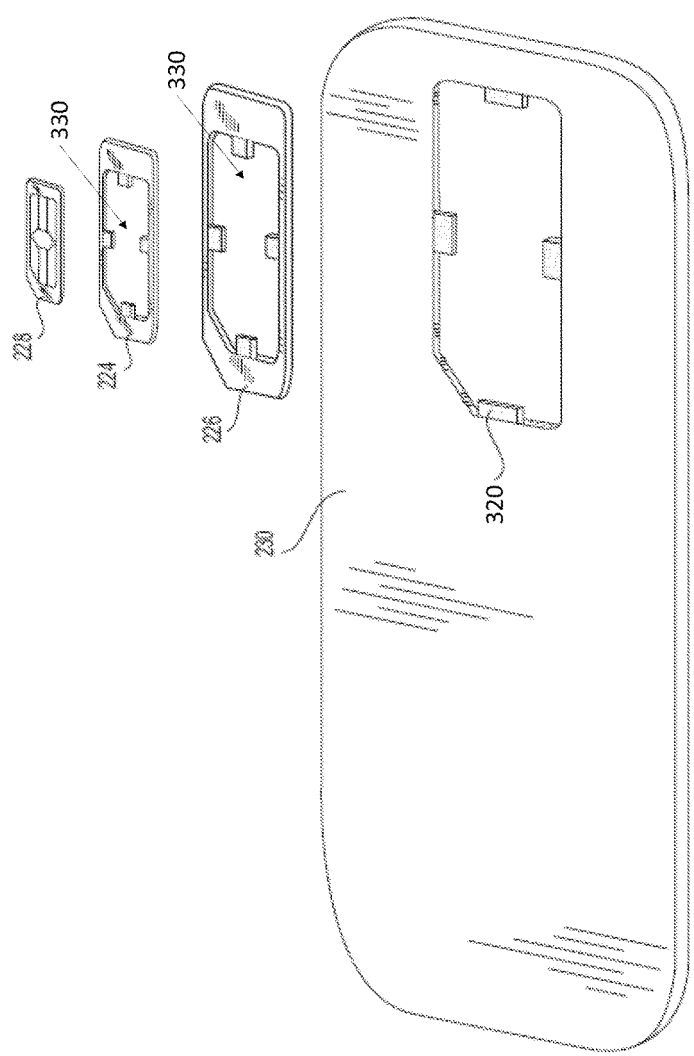
FIG. 6 illustrates a tri-cut SIM card with the nano-SIM card, the micro-SIM card portion, and the mini-SIM card portion removed, according to aspects of the disclosure.

FIG. 6 illustrates the removal of the mini-SIM card 226 from the tri-cut SIM card 230. To remove the mini-SIM card 226 from the tri-cut SIM card 230, the mini-SIM card 226 may be punched out from the tabs 320 holding the mini-SIM card 226 into the tri-cut SIM card 230. The mini-SIM card 226 may be removed from the tri-cut SIM card 230 with the micro SIM card 224 still connected within the mini-SIM card 226 within the cut-out space 330, and with the nano-SIM card 228 still connected within the micro-SIM card 224 within the cut-out space 330. The micro-SIM card 224 may be further removed from the mini-SIM card 224, and the nano-SIM card 228 may be further removed from the cut-out space 330 of the micro-SIM card 224 in a similar fashion as shown.

Figure 7:
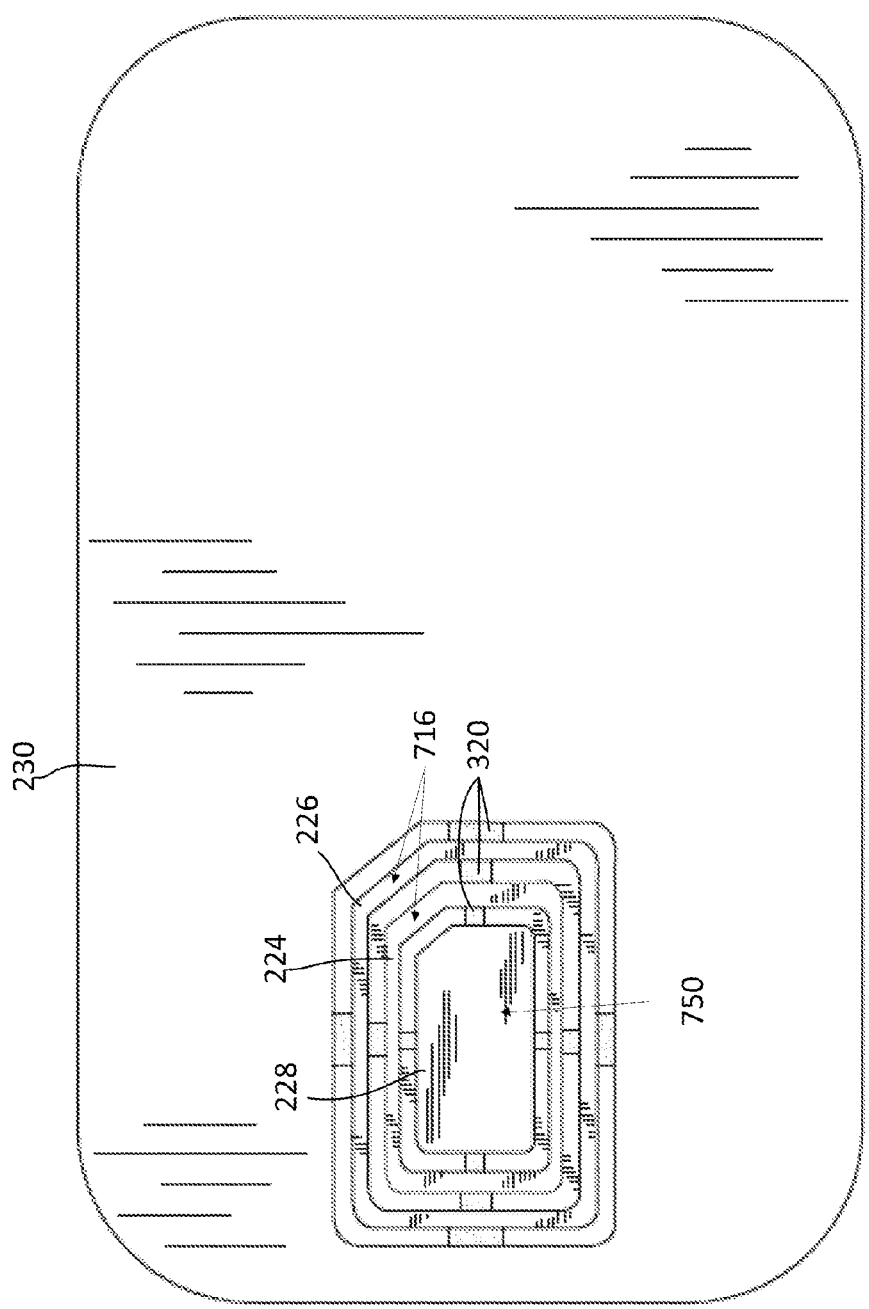
FIG. 7 illustrates a bottom surface of the tri-cut SIM card, according to aspects of the disclosure.

FIG. 7 illustrates the bottom surface of the tri-cut SIM card 230. The nano-SIM card 228 may be thinner than the micro-SIM card 224 and the mini-SIM card 226 as illustrated in FIG. 7. To accommodate for the difference in thickness of the nano-SIM card 228, the tri-cut SIM card 230 may employ a material layer 750 on the bottom surface of the nano-SIM card 228. The material layer 750 on the bottom surface of the nano-SIM card 228 may be removable from the nano-SIM card 228, as shown in more detail in FIG. 9. When the nano-SIM card 228 is removed from the tri-cut SIM card 230, the material layer 750 may also be removed with the nano-SIM card 228, as the material layer 750 may remain on the bottom surface of the nano-SIM card 228 until it is separately removed from the nano-SIM card 228. In this regard, the material backing 750 may utilize a less robust material and a less robust adhesive to attach the material backing 750 on the nano-SIM card 228.

In one aspect of the disclosure, the nano-SIM card 228 may be reused within the micro-SIM card 228 after the nano-SIM card 228 has been removed from the micro-SIM card 228. To reuse the nano-SIM card 228 within the micro-SIM card 224 after the nano-SIM card 228 has been removed from the micro-SIM card 224, the material backing 750 may be reapplied to the nano-SIM card 228. This approach may be similarly applied to reusing the nano-SIM card 228 with the other size SIM cards.

Alternatively or additionally, the tabs 320 may be configured to mechanically capture and hold the nano-SIM card 228 within the micro-SIM card 224 even after the nano-SIM card 228 has been removed from the micro-SIM card 224 and from the material backing 750. This approach may be similarly applied to reusing the nano-SIM card 228 with the other size SIM cards. In yet a further aspect, a new material backing 750 may be applied to the nano-SIM card 228 and the micro-SIM card 224 so that it adhesively holds these two cards together. This approach may be similarly applied to reusing the nano-SIM card 228 with the other size SIM cards.

The micro-SIM card 224 and the mini-SIM card 226 may instead have a material backing 716. The material backing 716 may be affixed to a bottom surface of the micro-SIM card 224 and of the mini-SIM card 226 so that when the micro-SIM card 224 and the mini-SIM card 226 are removed from the tri-cut SIM card 230, the material backing 716 may remain on the micro-SIM card 224 and the mini-SIM card 226. In this regard, the material backing 716 may utilize a more robust material and a more robust adhesive to attach the material backing 716 on the micro-SIM card 224 and the mini-SIM card 226.

Figure 8:
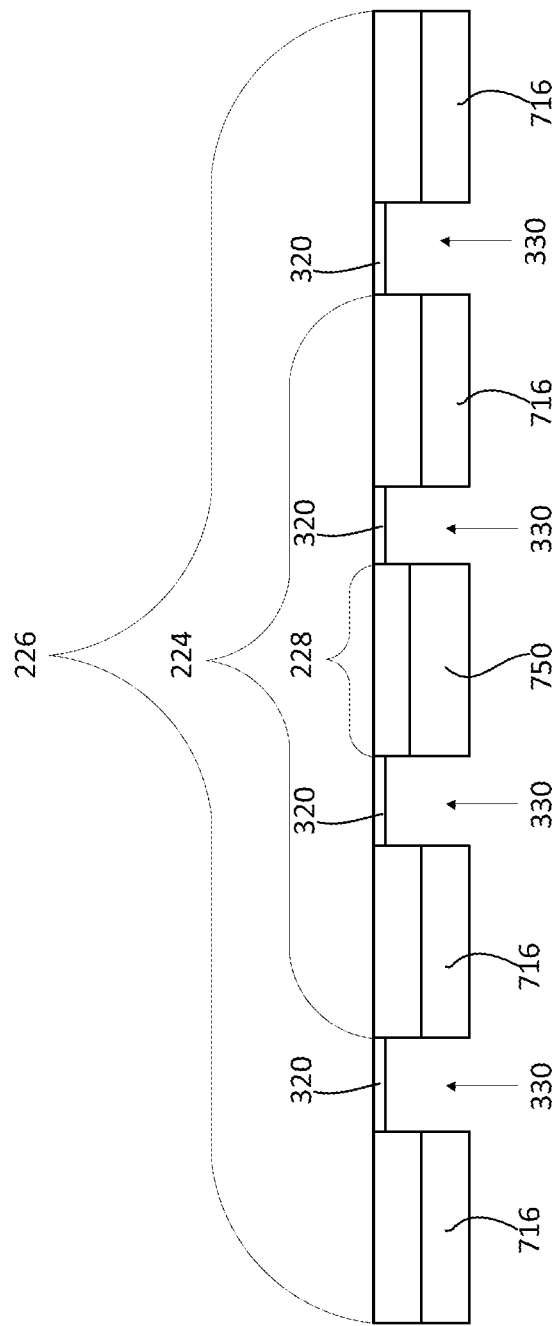
FIG. 8 illustrates a cross section view of the tri-cut SIM card, according to aspects of the disclosure.
Figure 9:
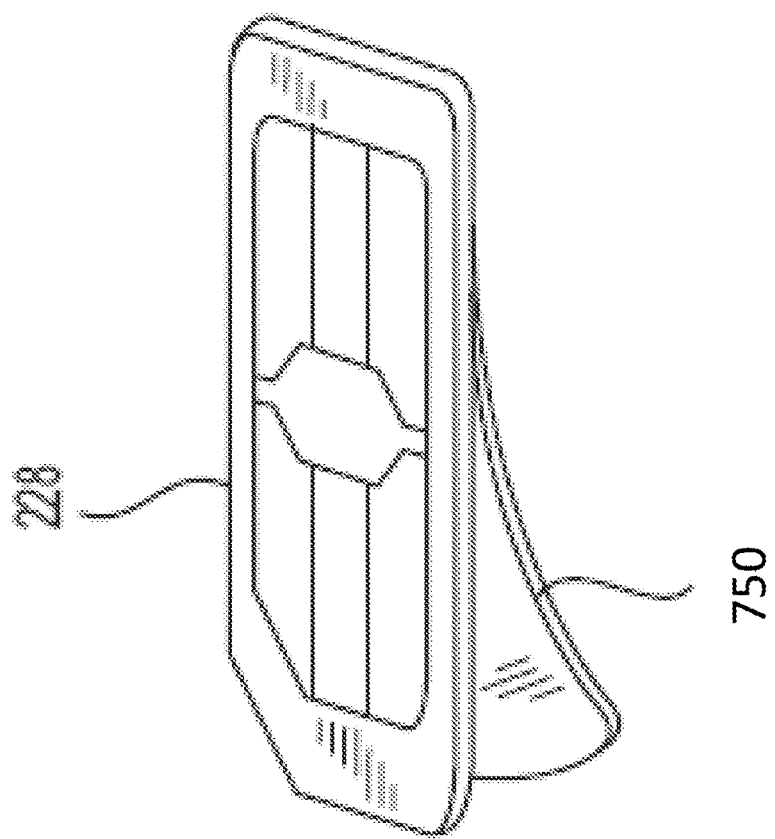
FIG. 9 illustrates the nano-SIM card with the material layer partially removed, according to aspects of the disclosure.

As illustrated in FIG. 8, because the thickness of the nano-SIM card 228 may be less than the thickness of the micro-SIM card 224 and the mini-SIM card 226, the nano-SIM card 228 may have the material layer 750 on the bottom surface of nano-SIM card 228. This may allow nano-SIM card 228 with the material layer 750 to be removed from the tri-cut SIM card 230 and tabs 320, but also the nano-SIM card 228 may be removable from the material layer 750 (as shown in FIG. 9). Meanwhile the material backing 716 may remain affixed to the micro-SIM card 224 and/or the mini-SIM card 226. Both the material backing 716 and the material layer 750 may be adhesives such as glue and the like or a combination of adhesives and materials such as glue and plastic, paper, or the like. The material backing 716 and the material layer 750 may also provide support for each SIM card 22 so that the SIM cards 22 do not break when being removed from the tri-cut SIM card 230.

For example, the nano-SIM card 228 may be 0.09 mm thinner than the micro-SIM card 224 and the mini-SIM card 226. In this example, the thickness of material layer 750 may therefore be 0.09 mm more than the thickness of material backing 716 in order to make the combined thickness of the nano-SIM card 228 with the material layer 750 the same as the combined thickness of the micro-SIM card 224 or the mini-SIM card 226 and the material backing 716. By making the combined thicknesses of each SIM card 22 equal while in the tri-cut SIM card 230, the SIM cards 22 may be flush within the tri-cut SIM card 230 so that they can be properly inserted into, read by, and removed from the wireless device 10. If the nano-SIM card 228 were not flush, meaning that if the nano-SIM card 228 was positioned within a cavity of the micro-SIM card 224 and/or the mini-SIM card 226, the SIM card 22 may not read properly within the wireless device 10 or may be difficult to insert into and remove from the wireless device 10.

FIG. 9 illustrates the removed nano-SIM card 228 being peeled from the material layer 750. The removal of the material layer 750 from the nano-SIM card 228 may allow the nano-SIM card 228 to be used individually. The material layer 750 may be removable from the nano-SIM card 228 in order to allow the nano-SIM card 228 to be used at its normal thickness without the material layer 750. The material layer 750 may be re-attachable to the nano-SIM card 228 in order to allow the nano-SIM card 228 to be used in combination with another SIM card 22, the material layer 750 again making up for the difference in thickness between the nano-SIM card 228 and the micro-SIM card 224 and the mini-SIM card 226.

Further in accordance with various aspects of the disclosure, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

The invention may be implemented in any type of computing devices, such as, e.g., a desktop computer, personal computer, a laptop/mobile computer, a personal data assistant (PDA), a mobile phone, a tablet computer, machine-to-machine (M2M) equipment, Internet-of-Things (IoT) device, cloud computing device, and the like, with wired/wireless communications capabilities via the communication channels 110.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the device and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A subscriber identity module card for wireless devices, comprising:
   a top surface;
   a bottom surface;
   a first cut-out space that includes a first memory card;
   a first material layer arranged on the bottom surface of the first memory card, wherein the first material layer is configured to remain on the bottom surface of the first memory card to provide a first thickness of the first memory card;
   a second memory card secured within a second cut-out space, said second memory card having said first material layer arranged on a bottom surface of said second memory card and having a third cut-out space, wherein the first material layer is configured to remain on the bottom surface of the second memory card to provide the first thickness of the second memory card; and
   a third memory card secured within the third cut-out space, said third memory card having a second material layer arranged on a bottom surface of said third memory card, wherein the second material layer is configured to be removed from the bottom surface of the third memory card to provide a second thickness of the third memory card,
   wherein the first memory card and the first material layer comprises the first thickness, the second memory card and the first material layer comprises the first thickness, the third memory card without the second material layer comprises the second thickness;
   wherein the first thickness is greater than the second thickness;
   wherein the first material comprises a first adhesive and the second material comprises a second adhesive;

wherein the first adhesive is more robust than the second adhesive; and wherein the first memory card, the second memory card and the third memory card together with the first material each have a thickness of 0.76 mm.

2. The subscriber identity module card of claim 1, wherein the first memory card is attached to a package, the second memory card is attached to the first memory card, and the third memory card is attached to the second memory card by one or more connecting mechanisms;

wherein the first material is arranged on a bottom surface of the package;

wherein the first material is arranged on the bottom surface of the first memory card;

wherein the first material is arranged on the bottom surface of the second memory card;

wherein the second material is arranged on the bottom surface of the third memory card;

wherein the first memory card is configured to be detachable from the package and the first memory card together with the first material layer is configured as a Mini-SIM;

wherein the second memory card with the first material layer is configured to be detachable from the package and the second memory card together with the first material is configured as a Micro-SIM; and wherein the third memory card is configured to be detachable from the subscriber identity module card to form a Nano-SIM with the second material layer removed.

3. The subscriber identity module card of claim 2, wherein the first memory card is detachable from the package and the first memory card together with the first material layer is configured to be the Mini-SIM having a thickness of 0.76 mm that includes the thickness of the first memory card together with the first material layer.

4. The subscriber identity module card of claim 2, wherein the second memory card with the first material layer is detachable from the package and the second memory card together with the first material is configured to be the Micro-SIM having a thickness of 0.76 mm that includes the thickness of the second memory card together with the first material layer.

5. The subscriber identity module card of claim 1, wherein the second memory card is detachable from the subscriber identity module card; and wherein the second memory card along with the first material layer comprises a Micro-SIM having a thickness of 0.76 mm that includes the thickness of the second memory card together with the first material layer.

6. The subscriber identity module card of claim 5, wherein the third memory card is detachable from the subscriber identity module card to form a Nano-SIM having a thickness of 0.67 mm that includes the thickness of the third memory card with the second material layer removed.

7. The subscriber identity module card of claim 1,
wherein the third memory card with the second material layer is configured to be detachable from the second memory card by a user; and
wherein the second material layer is configured to be detachable from the third memory card by a user to form a Nano-SIM having a thickness of 0.67 mm that includes the thickness of the third memory card with the second material layer removed.

8. A method of configuring a subscriber identity module card for wireless devices, comprising:
arranging a top surface on said subscriber identity module card;
arranging a bottom surface on said subscriber identity module card;
arranging a first cut-out space that includes a first memory card;
arranging a first material layer on the bottom surface of the first memory card;
securing a second memory card within a second cut-out space;
arranging said first material layer on a bottom surface of said second memory card;
arranging a third cut-out space within said second memory card;
securing a third memory card within said third cut-out space;
arranging a second material layer on a bottom surface of said third memory card;
arranging the subscriber identity module card within a package with the first memory card, the second memory card and the third memory card;
removing the third memory card from the second memory card; and
removing the second material layer from the third memory card to form a Nano-SIM,
wherein the first memory card and the first material layer comprises a first thickness, the second memory card and the first material layer comprises the first thickness, the third memory card without the second material layer comprises the second thickness;
wherein the first thickness is greater than the second thickness;
wherein the first material comprises a first adhesive and the second material comprises a second adhesive;
wherein the first adhesive is more robust than the second adhesive; and
wherein the first memory card, the second memory card and the third memory card together with the first material layer each have a thickness of 0.76 mm.

9. The method of claim 8, further comprising at least one of the following:
removing the first memory card from the subscriber identity module card with the first material layer intact to form a Mini-SIM having a thickness of 0.76 mm that includes the thickness of the first memory card together with the first material layer;
removing the second memory card from the subscriber identity module card with the first material layer intact to form a Micro-SIM having a thickness of 0.76 mm that includes the thickness of the second memory card together with the first material layer; and
removing the third memory card from the subscriber identity module card and removing the second material layer to form a Nano-SIM having a thickness of 0.67 mm that includes the thickness of the third memory card with the second material layer removed.

10. The method of claim 8, further comprising removing the first memory card from the subscriber identity module card with the first material layer intact to form a Mini-SIM having a thickness of 0.76 mm that includes the thickness of the first memory card together with the first material layer.

11. The method of claim 8, further comprising removing the second memory card with the first material layer intact to form a Micro SIM having a thickness of 0.76 mm that includes the thickness of the second memory card together with the first material layer.

12. The method of claim 8, wherein the combined thickness of the third memory card and the second material layer is the same as the combined thickness of the first memory card and the first material layer,
wherein the first memory card, the second memory card and the third memory card together with the first material each have a thickness of 0.76 mm;
wherein the first material comprises a first adhesive and the second material comprises a second adhesive; and
wherein the first adhesive is more robust than the second adhesive.

13. The method of claim 8, wherein arranging the subscriber identity module card within the package with the second memory card and the third memory card comprises attaching the subscriber identity module card to one or more connection mechanisms;
wherein the first memory card, the second memory card and the third memory card together with the first material each have a thickness of 0.76 mm;
wherein the first material comprises a first adhesive and the second material comprises a second adhesive; and
wherein the first adhesive is more robust than the second adhesive.

14. A subscriber identity module card for wireless devices, comprising:
a top surface;
a bottom surface;
a first cut-out space that includes a first memory card;
a first material layer arranged on the bottom surface of the first memory card, wherein the first material layer is configured to remain on the bottom surface of the first memory card to provide a first thickness of the first memory card;
a second memory card secured within a second cut-out space, said second memory card having said first material layer arranged on a bottom surface of said second memory card and having a third cut-out space, wherein the first material layer is configured to remain on the bottom surface of the second memory card to provide the first thickness of the second memory card; and
a third memory card secured within said third cut-out space, said third memory card having a second material layer arranged on a bottom surface of said third memory card, wherein the second material layer is configured to be removed from the bottom surface of the third memory card to provide a second thickness of the third memory card,
wherein the first memory card is attached to a package, the second memory card is attached to the first memory card, and the third memory card is attached to the second memory card by one or more connecting mechanisms;
wherein the first memory card is detachable from the package;
wherein the subscriber identity module card and the second memory card with the first material layer and the third memory card with the second material layer are configured to be detachable from the package,
wherein the second memory card with the first material layer and the third memory card with the second material layer are detachable from the subscriber identity module card;
wherein the first memory card and the first material layer comprises a first thickness, the second memory card and the first material layer comprises the first thickness, the third memory card without the second material layer comprises a second thickness;
wherein the first thickness is greater than the second thickness;
wherein the first memory card, the second memory card and the third memory card together with the first material layer each have a thickness of 0.76 mm;
wherein the first material comprises a first adhesive and the second material comprises a second adhesive; and
wherein the first adhesive is more robust than the second adhesive.

15. The subscriber identity module card of claim 14,
wherein the first memory card is configured to be detachable from the package and the first memory card together with the first material layer is configured as a Mini-SIM;
wherein the second memory card with the first material layer is configured to be detachable from the package and the second memory card together with the first material is configured as a Micro-SIM;
wherein the third memory card is configured to be detachable from the subscriber identity module card to form a Nano-SIM with the second material layer removed; and
wherein the first material and the second material are 0.09 mm in thickness.

16. The subscriber identity module card of claim 14, wherein the first memory card is detachable from the package and the first memory card together with the first material layer is configured to be a Mini-SIM having a thickness of 0.76 mm that includes the thickness of the first memory card together with the first material layer.

17. The subscriber identity module card of claim 14, wherein the second memory card with the first material layer is detachable from the package and the second memory card together with the first material is configured to be a Micro-SIM having a thickness of 0.76 mm that includes the thickness of the second memory card together with the first material layer.

18. The subscriber identity module card of claim 14, wherein the third memory card is detachable from the subscriber identity module card to form a Nano-SIM having a thickness of 0.67 mm that includes the thickness of the third memory card with the second material layer removed.

19. The method of claim 8,
wherein the first memory card, the second memory card and the third memory card together with the first material layer each have a thickness of 0.76 mm;
wherein the first memory card is detachable from the package and the first memory card together with the first material layer is configured to be a Mini-SIM having a thickness of 0.76 mm that includes the thickness of the first memory card together with the first material layer;
wherein the second memory card with the first material layer is detachable from the package and the second memory card together with the first material is configured to be a Micro-SIM having a thickness of 0.76 mm that includes the thickness of the second memory card together with the first material layer; and
wherein the third memory card is detachable from the subscriber identity module card to form a Nano-SIM having a thickness of 0.67 mm that includes the thickness of the third memory card with the second material layer removed.

* * * * *